No. 666,836. Patented Jan. 29, 1901.
W. M. WHEILDON.
JOURNAL BOX.
(Application filed June 26, 1900.)
(No Model.)
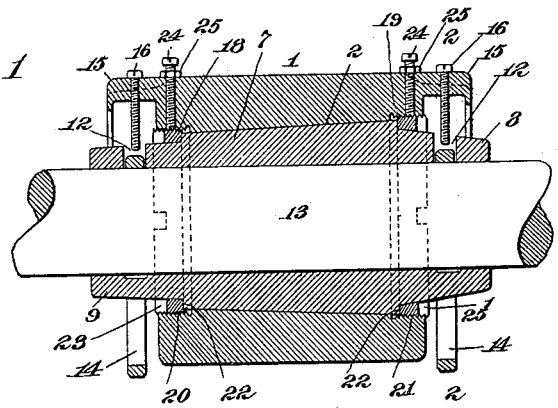
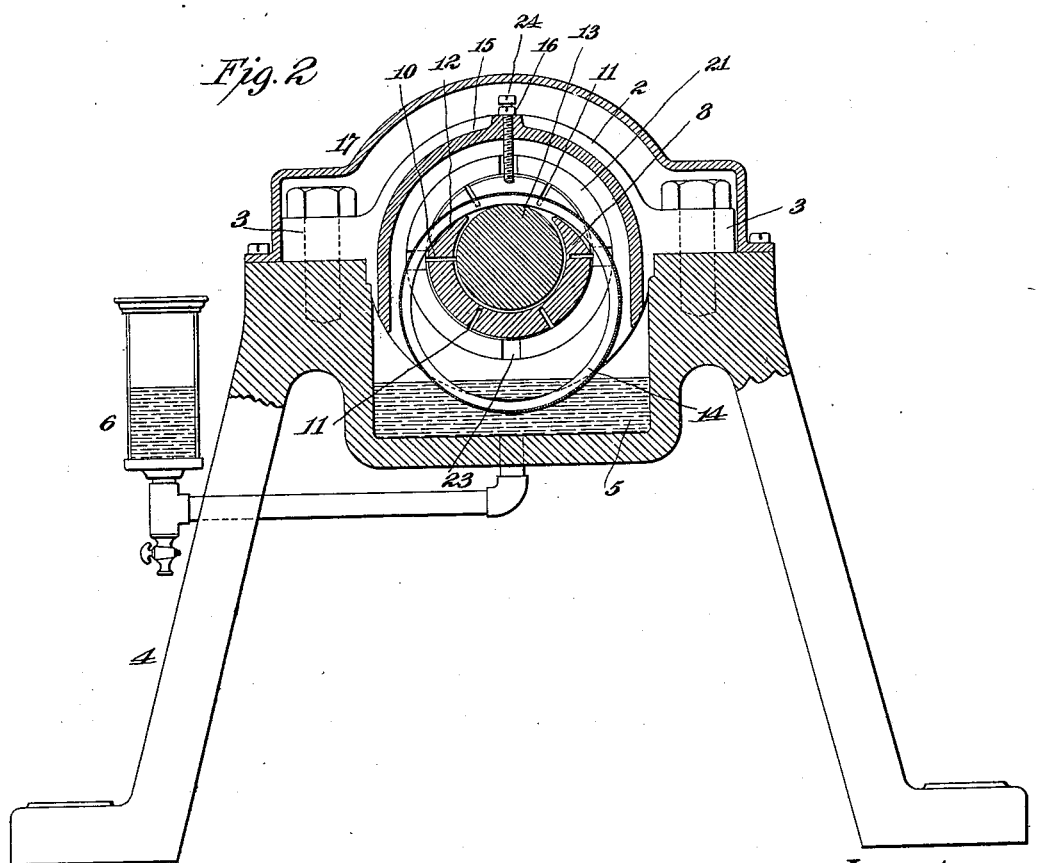

UNITED STATES PATENT OFFICE.

WILLIAM MAXWELL WHEILDON, OF BOSTON, MASSACHUSETTS, ASSIGNOR TO THE AERO-PULVERIZER COMPANY, OF JERSEY CITY, NEW JERSEY.

JOURNAL-BOX.

SPECIFICATION forming part of Letters Patent No. 666,836, dated January 29, 1901.

Application filed June 26, 1900. Serial No. 21,636. (No model.)

*To all whom it may concern:*

Be it known that I, WILLIAM MAXWELL WHEILDON, a citizen of the United States, residing at Boston, in the county of Suffolk and State of Massachusetts, have invented a certain new and useful Improvement in Journal-Boxes, of which the following is a description.

My invention relates to various new and useful improvements in journal-boxes of the type employing a substantially continuous lining-sleeve radially adjustable with respect to the shaft and longitudinally adjustable with respect to the housing, hanger, pedestal, bracket, or other fixed support for the box. Journal-bearings of this type are capable of extremely accurate adjustment without affecting the centers, and hence are of special utility in machines or apparatus wherein three or more boxes are employed for supporting a single shaft.

The object of my invention is to provide a journal-bearing of this type which will be simple and compact in construction and which shall be capable of accurate and easy adjustment for the taking up of wear.

To this end my invention comprises, essentially, a continuous box adapted to be supported by any suitable housing, hanger, pedestal, bracket, or other support, said box having a tapered bore in which is fitted a tapered lining or sleeve longitudinally cut to permit of its radial adjustment with respect to the shaft, said lining being adjustably held in position within the box between two adjusting-rings, which engage screw-threads cut at the ends of the tapered bore, whereby the lining will be held with entire rigidity in the box and a delicate longitudinal adjustment thereof can be secured to adjust the lining radially with respect to the shaft for the purpose of taking up wear.

In order that the invention may be better understood, attention is directed to the accompanying drawings, forming part of this specification, and in which—

Figure 1 is a longitudinal section through the box and lining, showing the shaft in position; and Fig. 2, a section taken at right angles to Fig. 1 on the line 2 2, showing the box secured in place to a suitable pedestal or pillow-block.

In both the above views corresponding parts are represented by the same numerals of reference.

1 represents the box, which is of a generally cylindrical form, with a tapered bore 2 and having cast lugs or ears 3, by means of which the box may be bolted to the pedestal, pillow-block, housing, bracket, or other support. I show the box 1 bolted to an ordinary pedestal 4, formed with an oil-receptacle 5 therein, provided with a sight-feed 6. When the box has been secured in place to the pedestal or other support, it requires no further adjustment, since wear is taken up by radial adjustment of the lining, as will be explained.

7 represents the lining-sleeve, which is made preferably of phosphor-bronze and which is provided with a main portion, which accurately fits the tapered bore of the box, and with two reduced portions 8 and 9, which extend on either side of the tapered bore of the box. The lining is divided longitudinally by a cut 10, which extends entirely through it, and other cuts 11 are formed radially therein to permit the lining to accurately conform to the shaft when it is contracted radially. The extensions 8 and 9 of the lining are formed with cuts or slots 12, which extend through the lining, so as to disclose the shaft 13. Working in each of these cuts is a ring 14, which engages the shaft and which dips within the oil in the oil-well 5, so that the turning of the shaft will result in its lubrication by the rings 14 in the usual way.

The box 1 is formed at each end with an overhang 15, which partially encircles the extensions 8 and 9 of the lining and which prevents the rings 14 from throwing oil beyond the box when running at high speed. Passing through each overhang is a bolt 16, which engages within the slot 12, immediately below the same, to prevent the lubricating-rings from becoming accidentally dislodged when for any reason the rings tend to run improperly on the shaft when operating at high speeds.

The entire box may be inclosed by a suitable casing 17, secured to the housing, pedestal, or other support, as shown. The overhanging portions 15, as explained, prevent oil from being thrown off by the lubricating-rings and in this way prevent leakage of oil at the joint between the casing 17 and the support.

The bore 2 of the box is formed at each end with screw-threads 18 and 19, with which adjusting-rings 20 and 21 respectively engage, as shown, the former being obviously of smaller diameter than the latter. These adjusting-rings are adapted to engage the shoulders 22 of the lining to hold the latter firmly clamped in position within the bore. Each adjusting-ring is formed with spanner-openings 23, in which a spanner may be engaged to rotate the rings, whereby the sleeve may be adjusted longitudinally with respect to the box so as to effect a very delicate radial adjustment thereof with respect to the shaft. In order to lock the adjusting-rings 20 and 21 rigidly in place to prevent accidental dislodgment thereof, I employ a locking-bolt 24, which passes through the top of the box, at each end, as shown, and engages with said rings, each of said bolts being preferably provided with an ordinary lock-nut 25.

Having now described my invention, what I claim as new, and desire to secure by Letters Patent, is as follows:

1. In a journal-bearing of the type described, the combination of a continuous box having a tapered bore, a tapered sleeve or lining carried in said bore and split longitudinally, and an adjusting-ring threaded into each end of the box and engaging said lining to hold the latter rigidly in position and to effect longitudinal adjustment thereof, substantially as set forth.

2. In a journal-bearing of the type described, the combination of a continuous box having a tapered bore, a tapered sleeve or lining carried in said bore and split longitudinally, a shaft mounted in the sleeve or lining, an adjusting-ring threaded into each end of the box and engaging said lining to hold the latter rigidly in position and to effect longitudinal adjustment thereof, the sleeve or lining being provided with slots for disclosing the shaft, and lubricating-rings working in said slots and engaging the shaft, substantially as set forth.

3. In a bearing of the type described, the combination of a continuous box having an overhanging hood at each end and provided with a tapered bore, a tapered split sleeve or lining fitted into the tapered bore and adjustable longitudinally therein, a shaft mounted in said lining, an adjusting-ring threaded into each end of the box and engaging the corresponding end of the tapered portion of the lining, extensions from said lining extending within the overhanging hoods, said extensions being slotted to disclose the shaft, and a lubricating-ring working in each slot and engaging the shaft, substantially as set forth.

4. In a bearing of the type described, the combination of a continuous box having an overhanging hood at each end and provided with a tapered bore, a tapered split sleeve or lining fitted into the tapered bore and adjustable longitudinally therein, a shaft mounted in said lining, an adjusting-ring threaded into each end of the box and engaging the corresponding end of the tapered portion of the lining, extensions from said lining extending within the overhanging hoods, said extensions being slotted to disclose the shaft, a lubricating-ring working in each slot and engaging the shaft, and a screw passing through the overhanging hood and entering said slot for preventing dislodgment of the lubricating-ring therein, substantially as set forth.

This specification signed and witnessed this 14th day of June, 1900.

WILLIAM MAXWELL WHEILDON.

Witnesses:
FRANK L. DYER,
JNO. R. TAYLOR.